United States Patent
Maekawa (10) Patent No.: US 6,547,951 B1
(45) Date of Patent: Apr. 15, 2003

(54) METHOD AND APPARATUS FOR TREATMENT OF ORGANIC MATTER-CONTAINING WASTEWATER

(75) Inventor: Takaaki Maekawa, Ibaraki (JP)

(73) Assignee: Daishin Design Corporation, Hokkaido (JP)

( * ) Notice: Subject to any disclaimer, the term of this patent is extended or adjusted under 35 U.S.C. 154(b) by 0 days.

(21) Appl. No.: 09/914,538

(22) PCT Filed: Mar. 3, 2001

(86) PCT No.: PCT/JP00/01305

§ 371 (c)(1),
(2), (4) Date: Aug. 30, 2001

(87) PCT Pub. No.: WO00/55097

PCT Pub. Date: Sep. 21, 2000

(30) Foreign Application Priority Data

Mar. 15, 1999 (JP) .......................................... 11-068862

(51) Int. Cl.[7] .................................................. C02F 1/461
(52) U.S. Cl. ........................ 205/688; 205/742; 205/759; 204/272; 204/275.1
(58) Field of Search .................................. 205/688, 759, 205/742; 204/272, 275.1

(56) References Cited

U.S. PATENT DOCUMENTS

| | | | | |
|---|---|---|---|---|
| 4,113,601 A | * | 9/1978 | Spirig | ......................... 204/230 |
| 4,119,518 A | | 10/1978 | Miller | |
| 6,156,168 A | * | 12/2000 | Verrier | ......................... 204/272 |

FOREIGN PATENT DOCUMENTS

| | | |
|---|---|---|
| EP | 0 769 475 | 4/1997 |
| GB | 1 596 073 | 8/1981 |
| JP | 10-323674 | 12/1998 |
| WO | 80/00226 | 2/1980 |
| WO | 97/11908 | 4/1997 |

* cited by examiner

Primary Examiner—Arun S. Phasge
(74) Attorney, Agent, or Firm—Wenderoth, Lind & Ponack, L.L.P.

(57) ABSTRACT

Disclosed is a novel method for treatment of wastewater containing organic contaminant materials by oxidatively decomposing the contaminant materials by a radical reaction involving hydroxyl radicals. The method comprises passing the wastewater through a wastewater treatment conduit (6) comprising a straightly tubular member (6) and a radical generating part consisting of a truncated pyramidal or conical tubular member (1) having an inner surface layer of titanium dioxide to serve as a positive electrode and connected to the upstream end of the straightly tubular member and a negative electrode rod (4) coaxially held relative to the truncated tubular member and applying a pulsed DC voltage having a rectangular wave form at a specified frequency. The efficiency of wastewater treatment can be improved by providing an ultrasonic part consisting of a truncated tubular member similar (7) to the above and connected to the downstream end of the straightly tubular member and an ultrasonic vibrator (8) mounted thereon to emit pulsed ultrasonic waves.

8 Claims, 4 Drawing Sheets

METHOD AND APPARATUS FOR TREATMENT OF ORGANIC MATTER-CONTAINING WASTEWATER

TECHNICAL FIELD

The present invention relates to a method and apparatus for treatment of a wastewater containing organic matters. More particularly, the invention relates to a method of wastewater treatment and apparatus therefor when the wastewater contains organic matters hardly disposable by the methane fermentation digestion method and activated sludge method or when the wastewater contains a hardly decomposable or removable eutrophic substance such as nitrogen- and/or phosphorus-containing organic compounds.

BACKGROUND ART

As is known, treatment of wastewater containing hardly decomposable organic matters is conducted in the prior art mainly by the so-called activated sludge method, intermittent aeration digestion methods or denitrification method. These prior art methods, however, are each a kind of biological decomposition methods so that, when the wastewater to be treated contains a large amount of hardly decomposable organic matters, the wastewater must be diluted, prior to transfer to a treatment plant, by adding a large volume of fresh water resulting in a great increase of the wastewater volume to be treated, which leads to an increase in the electric power consumption and an increase in the cost for the process of wastewater treatment. In addition, these prior art methods are defective in respect of the low efficiency for the removal of nitrogen-containing matters reaching 50 to 80% at the highest.

With an object to overcome the above described difficulties, a method is proposed in the prior art in which a supernatant liquid from digestion of a wastewater containing hardly decomposable contaminant substances such as polyphenols is treated with ozone to oxidatively decompose the contaminant substances. This method is also not quite practical because the concentration of ozone must be high enough with an unavoidable increase in the treatment cost.

Besides, the method of contact aeration has a problem of a low efficiency for oxidation and the digestion method is defective because, although use of ozone in this method is effective, this method is applicable only to a sea water-based wastewater containing a relatively large amount of bromine ions since otherwise the amount of radical generation is very small not to complete denitrification.

On the other hand, it is known that oxygen radicals having a life of 10 to 100 $\mu$s are generated in the pores found in the surface layer consisting of particles of titanium dioxide, tin oxide, iridium dioxide and the like when electrons enter the pores and the oxygen radicals have an activity of oxidatively decomposing carbon- and nitrogen-containing contaminant matters while the efficiency of oxygen radical generation can be improved by appropriately selecting the electric voltage between the electrodes, electric current passing between the electrodes, frequency of the electric field applied, dimensions of the pores on the metal oxide surface and the degree of cleanliness desired for the wastewater after treatment.

It is, however, the present status of the above proposed method of utilizing oxygen radicals that the method has not yet been rendered to practice for wastewater treatment.

DISCLOSURE OF INVENTION

The present invention has been completed with an object to provide, by utilizing oxygen radicals and hydroxyl radicals, to which no attention is directed heretofore, a novel and efficient method for the treatment of wastewater containing hardly decomposable contaminant substances and to provide an apparatus for practicing the method.

The inventor has continued extensive investigations on the behavior of oxygen radicals and hydroxyl radicals generated on the surface of a metal oxide and, as a result thereof, has arrived at a discovery that the efficiency for the generation of these radicals can be improved and sustain ability of the radicals can be increased when the electric field applied between electrodes for radical generation satisfies specific conditions and that the efficiency of wastewater treatment can be improved by increasing the contacting time between the wastewater and the metal oxide surface leading to completion of the present invention on the base of this discovery. Additionally, it has been discovered that, when the wastewater contains a large amount of suspended solid matters (SS), a remarkable improvement can be obtained in the efficiency of wastewater treatment by applying ultrasonic waves to the wastewater flowing between the electrodes presumably due to a cleaning effect on the electrode surfaces.

Namely, the present invention provides an improvement, in a method for wastewater treatment in which the wastewater containing organic matters and flowing through a wastewater channel is passed between a positive electrode having a surface made from a specific metal oxide and a negative electrode having a surface of a noble metal forming a radical generating zone so as to clarify the wastewater by oxidatively decomposing the organic matter contained therein with application of a direct-current voltage between the electrodes, which is characterized in that the flow channel of the wastewater has a cross sectional profile gradually increasing from the upstream to the downstream and the direct-current voltage applied between the electrodes has a voltage gradient of 0.2 to 6 kV/cm in a rectangular pulsed wave form at a frequency of 10 kHz to 150 kHz to give an electric current density of 5 $\mu$Å/cm$^2$ to 50 mÅ/cm$^2$ between the electrodes.

Further, the improvement comprises applying pulsed ultrasonic waves to the flowing wastewater in an ultrasonic zone located just downstream of the radical generating zone under such a time sequence control that the pulses of the direct-current voltage applied to the electrodes and the pulses of the ultrasonic waves are not overlapped in time sequence.

Further, the apparatus of the present invention for practicing the above described method of wastewater treatment is characterized in comprising a tubular conduit having, at one end, a radical generating zone consisting of a first truncated part with a side surface having a surface layer of a metal oxide to serve as a positive electrode and opening at the top flat to serve as a wastewater intake, the side surface of the truncated part making an angle of 5 to 40 degrees with the axis of the tubular part, and a negative electrode in the form of a rod having a surface layer of a noble metal and insulated from the positive electrode, the negative electrode being located along the axis of the tubular part and the positive electrode and the negative electrode being connected to a direct-current power source capable of applying a direct-current pulse voltage of a rectangular wave form at a frequency of 10 kHz to 150 kHz to the electrodes forming a voltage gradient of 0.2 to 6 kV/cm between the electrodes with an electric current density of 5 $\mu$Å/cm$^2$ to 50 mÅ/cm$^2$.

Further, the above described tubular conduit of the inventive apparatus has an ultrasonic zone consisting of a second truncated part opening at the top flat to serve as a wastewater outgo and connected to the tubular part at the other end opposite to the radical generating zone, the side surface of the second truncated part making an angle of 5 to 40 degrees with the axis of the tubular part and an ultrasonic vibrator being mounted on the second truncated part.

The method of the present invention for wastewater treatment is an electrochemical process utilizing oxygen radicals and hydroxyl radicals originating in water molecules. The hydroxyl radicals may react with a carbon source material generating carbon dioxide according to the following reaction equation:

$$C + 2(OH)\cdot \rightarrow CO_2 + 2H^+.$$

When the wastewater under treatment contains a large amount of suspended solid matters, there may be possible disadvantages of excessively large consumption of electric energy required for charging up the particles and deposition of a large amount of the particles in the pores of the metal oxide electrode resulting in a great decrease in the radical generating reaction. This disadvantage can be overcome by means of the ultrasonic waves applied to the ultrasonic zone of the tubular conduit.

BEST MODE FOR CARRYING OUT THE INVENTION

In the following, preferred embodiments of the invention are described in detail by making reference to the figures of the accompanying drawing.

In FIGS. 1 to 4, the side wall 2 of the truncated part 1 forming the radical generating zone has a surface layer formed from a metal oxide such as titanium dioxide, tin oxide, iridium dioxide and the like and electrically connected to the positive electrode terminal of a direct-current power source (not shown in the figures). The top flat 3 of the truncated part 1 is open to serve as an intake of the wastewater. A rod-formed electrode 4 having a surface layer of a noble metal is disposed along the axis of the truncated part 1 and the straightly tubular part 6 connected to the truncated part 1 and connected to a negative electrode terminal of the direct-current power source.

The side wall 2 of the truncated part 1 is formed, for example, by press-bonding particles of a metal oxide such as titanium oxide, tin oxide and iridium dioxide onto the surface of a plate-formed electroconductive material. The metal oxide particles should have a particle diameter in the range from 10 to 500 $\mu$m or, preferably, from 20 to 100 $\mu$m.

The side wall 2 of the truncated part 1 makes an angle of 5 to 40 degrees with the axis or, namely, the center electrode rod 4 so that the cross sectional area of the flow channel is small at the wastewater intake of the top flat 3 of the truncated part 1 and large at the bottom of the truncated part 1. It is preferable that the cross sectional area of the flow channel through the radical generating zone 1 is expanded from the intake, i.e. the open top flat 3, toward the bottom of the truncated part 1 by a factor of 20 to 1000 times thus to decrease the flow velocity of the wastewater inversely proportionally to the cross sectional area.

The noble metal forming the surface layer of the rod-formed center electrode 4 is preferably platinum though not particularly limitative and any noble metals conventionally used as a cathode material in electrolytic or electrochemical processes can be used.

The truncated part 1 forming the radical generating zone is connected to the straightly tubular part 6 at the lower end of the side walls 2 with intervention of an insulating spacer 5.

When wastewater containing an organic contaminant matter dissolved therein is passed through the above described radical generating zone 1 taking a staying time of several tens of seconds, the organic matter is oxidatively decomposed to evolve a decomposition gas which is a mixture of nitrogen gas and carbon dioxide gas plus a small volume of oxygen gas. The efficiency of this oxidative decomposition of the organic matter depends on the activity of the metal oxide forming the surface layer of the side wall 2 of the truncated part 1. For example, tin oxide exhibits the highest activity among the above named three kinds of metal oxides decreasing in the order of iridium dioxide and titanium oxide. Platinum is an alternative material to metal oxides although the activity thereof is considerably lower than metal oxides.

The positive and negative electrodes in the inventive apparatus are connected to the electrode terminals of a power source capable of generating direct-current pulse waves of a rectangular wave form at a frequency of 10 kHz to 150 kHz to produce a voltage gradient of 0.2 to 6 kV/cm between the electrodes at a current density in the range from 5 $\mu$Å/cm$^2$ to 50 mÅ/cm$^2$. These parameters are important in order to ensure a high efficiency of wastewater treatment according to the inventive method.

When the content of suspended solid matters (SS) in the wastewater subjected to the wastewater treatment process does not exceed 1000 mg/liter, a sufficiently good efficiency of wastewater treatment can be obtained only by the application of the above described radical generating zone to the stream of the wastewater. As is usually the case, when the content of suspended solid matters in wastewater is much higher than 1000 mg/liter sometimes reaching 10000 mg/liter, the efficiency of wastewater treatment can be improved by providing an ultrasonic zone to the tubular wastewater conduit. Namely, application of ultrasonic waves has a cleaning effect on the electrode surfaces and an effect of removing any contaminant materials deposited in the pores of the surface layer of the positive electrode available for oxidative decomposition.

Figure 1:
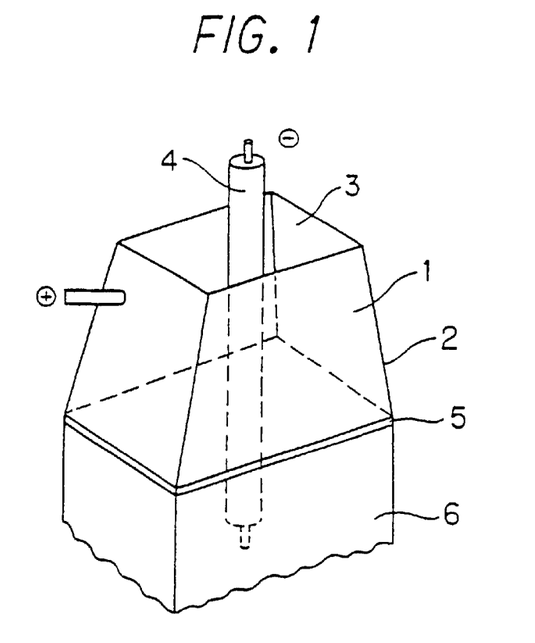
FIG. 1 is a schematic partial perspective view of the tubular conduit in the inventive apparatus showing a rectangular cross section of the tubular part connected to a pyramidal truncated part for the radical generating zone.
Figure 2:
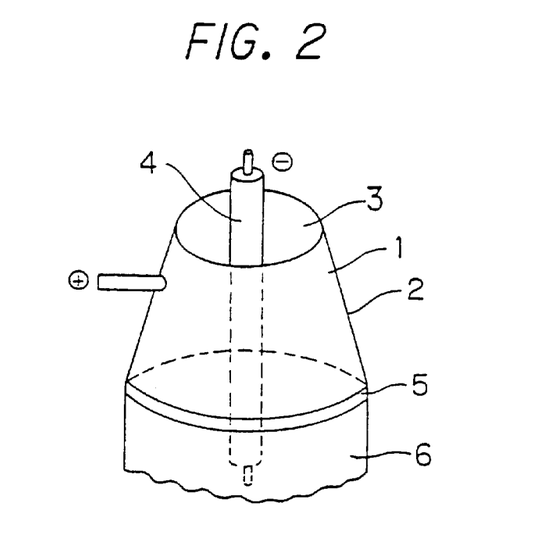
FIG. 2 is a schematic partial perspective view of the tubular conduit in the inventive apparatus showing a circular cross section of the tubular part connected to a conical truncated part for the radical generating zone.
Figure 3:
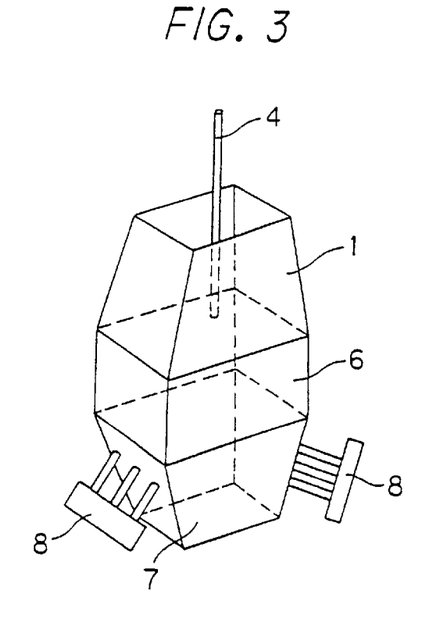
FIG. 3 is a schematic perspective view of the tubular conduit having a rectangular cross section connected to pyramidal truncated parts for the radical generating zone and for the ultrasonic zone.
Figure 4:
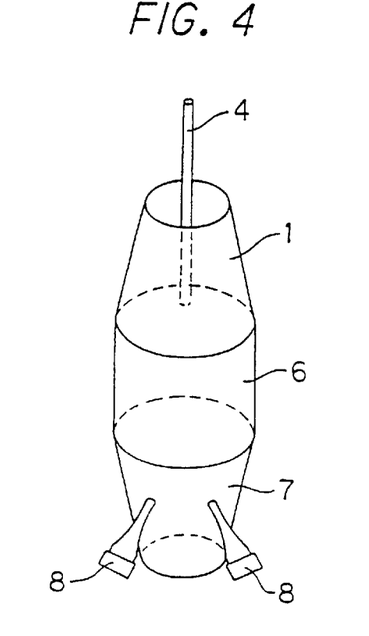
FIG. 4 is a schematic perspective view of the tubular conduit having a circular cross section connected to conical truncated parts for the radical generating zone and for the ultrasonic zone.

FIGS. 3 and 4 each illustrate a schematic perspective view of a tubular wastewater conduit consisting of a straightly tubular part 6 having a rectangular or circular cross section, respectively, a first truncated pyramidal or conical part 1 connected to the upstream end of the tubular part 6 to serve as a radical generating zone and a second truncated pyramidal or conical part 7 connected to the downstream end of the tubular part 6 to serve as the ultrasonic zone. Two ultrasonic vibrators 8,8 are installed on the side wall of the ultrasonic zone 7 at radially separated positions spanning a radial angle of 30 to 45 degrees with the axis of the conduit illustrated in FIG. 4 having a circular cross section and on two opposite side surfaces of the ultrasonic zone 7 in the conduit illustrated in FIG. 3 having a rectangular cross section. The ultrasonic waves have a pulsed wave form at a frequency of 20 kHz to 100 kHz.

It is important that the direct-current voltage of a pulsed wave form applied to the electrodes of the radical generating zone and the ultrasonic waves of a pulsed wave form are under a time-sequence control in such a manner that the ultrasonic emission is interrupted during application of pulses of direct-current voltage. The pulse width ratio of the direct-current and ultrasonic pulses is selected depending on the C/N ratio in the wastewater under treatment. Assuming a cycle period of 1 second, for example, the period of ultrasonic emission is selected in the range from 0.2 to 0.8 second. Namely, for example, 5000 ultrasonic pulses are emitted within 0.5 second of the ultrasonic duration time at a frequency of 10 kHz or 100 $\mu$is per pulse corresponding to 5000 times of electric field application assuming a duty ratio of 50%.

When the inventive wastewater treatment method is applied to wastewater containing carbon source and nitrogen source substances dissolved therein, carbon dioxide is formed from the carbon source substance and a gaseous mixture of about 80% of nitrogen and the balance of $NO_x$ gases is produced from the nitrogen source substance in a proportion depending on the proportion of the source substances Similarly, a gaseous mixture containing 80 to 90% of sulfur oxides $SO_x$ is produced from a sulfur source substance. In a typical case, accordingly, the gas evolved in the wastewater treatment process consists of 50 to 60% by volume of carbon dioxide, 0.1 to 2% by volume of oxygen, 60 to 70% by volume of nitrogen, 1 to 3% by volume of $SO_x$ gases, 10 to 20% by volume of $NO_x$ gases and 0.01 to 0.02% by volume of hydrogen. The above described fact that evolution of hydrogen gas in the inventive process is very small strongly supports the conclusion that the chemical process proceeding in the inventive wastewater treatment is not an electrolytic decomposition of water but a radical reaction to which oxygen radicals and hydroxyl radicals pertain.

Since the waste gaseous evolution from the inventive wastewater treatment contains environmental pollutant gases such as carbon dioxide, $NO_x$ gases, $SO_x$ gases and others, it is desirable that the gaseous evolution is not discharged out of the wastewater treatment system. When the volume of the gaseous evolution is not so large, it is a possible way that the gaseous evolution is returned to the pipeline system for the biogas from the digestion chamber. When the volume of waste gas evolution is large, it is advantageous that the wastewater treatment system according to the present invention is combined with a biomethanation system having a bioreactor utilizing methane bacteria capable of assimilating carbon dioxide and hydrogen, into which the waste gas as mixed with 4 moles of hydrogen gas per mole of the carbon dioxide is introduced so as to form methane gas along with utilization of the $NO_x$ and $SO_x$ gases as the nutrient source of the methane bacteria.

In the following, the present invention is described in more detail by way of examples.

REFERENCE EXAMPLE

With an object to investigate the correlation between evolution of carbon dioxide or nitrogen gas from wastewater and decrease in the COD value or content of ammonic nitrogen in the wastewater by an oxidation treatment, a simulation oxidation treatment test was undertaken for simulation wastewater containing 4000 mg/liter of ammonic nitrogen and 5000 mg/liter of COD substances by using positive and negative electrodes each made from platinum by varying the power input thereto.

Figure 5:
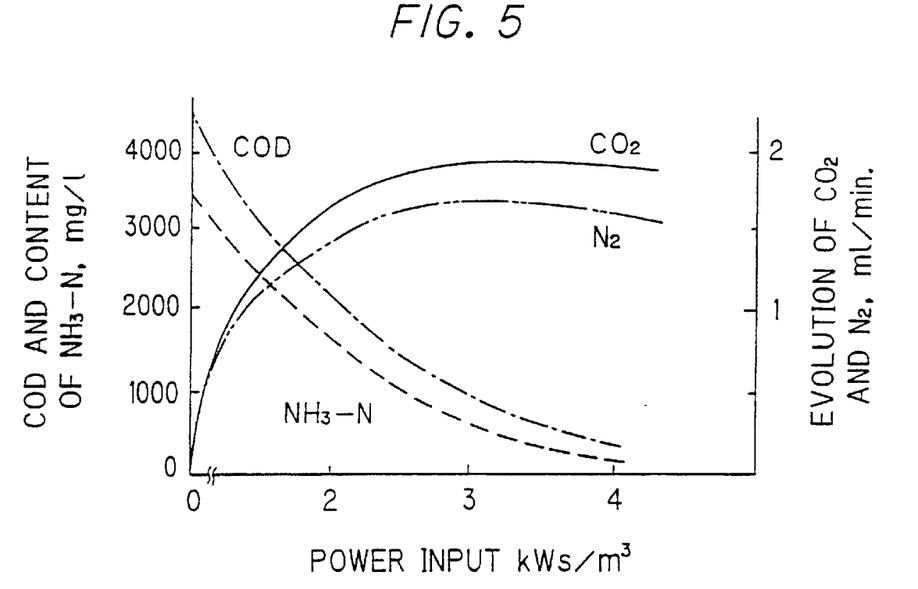
FIG. 5 is a graph showing decreases in COD and in $NH_3$-nitrogen and evolution of carbon dioxide and nitrogen in Reference Example as a function of the power input.

The results are shown in FIG. 5 which gives evolution of carbon dioxide and nitrogen gases per minute (right ordinate) and COD value and content of ammonic nitrogen (left ordinate) as a function of the power input to the wastewater. This graph clearly supports the conclusion that the COD substances and ammonic nitrogen are converted into carbon dioxide and nitrogen, respectively, by the inventive wastewater treatment method.

EXAMPLE 1

The radical generating zone was constructed by a coaxial assembly of a platinum rod as a negative electrode and a titanium dioxide-coated plate as the positive electrode defining a truncated conical zone, of which the generating line had a length of 20 cm and made an angle of 10 degrees with the axis, keeping an average distance of 4 cm between the electrodes. The electrodes were connected to a direct-current power source capable of generating a pulse voltage of 2 kV/cm at a frequency of 10 kHz with a duty ratio of 50% and a current density of 5 to 7 mÅ/cm$^2$ Separately, another truncated conical part defining the ultrasonic zone was connected to the downstream end of a straightly cylindrical part, to which the radical generating zone was connected at the upstream end, and two ultrasonic vibrators capable of emitting ultrasonic waves at a frequency of 28 kHz with a power output of 50 watts or effective power output of 25 watts were installed thereto.

A liquid obtained by digestion by methane fermentation of the excrementitious discharge out of a swinery, which contained 3000 mg/liter of suspended solid matters and 4500 mg/liter of ammonic nitrogen and had a COD value of 6000 mg/liter, was passed through the above constructed tubular wastewater conduit at a linear flow rate of 0.9 cm/second while the direct-current pulse voltage and the ultrasonic waves were applied to the radical generating zone and ultrasonic zone, respectively, alternately at a 0.5 second period. The power consumption was 1.5 kW-hour/day per cubic meter of the digestion liquid.

The results of the above described treatment were that the decrease in the COD value in the effluent was 95 to 99% and total nitrogen elimination reached 97 to 98%.

EXAMPLE 2

Figure 6:
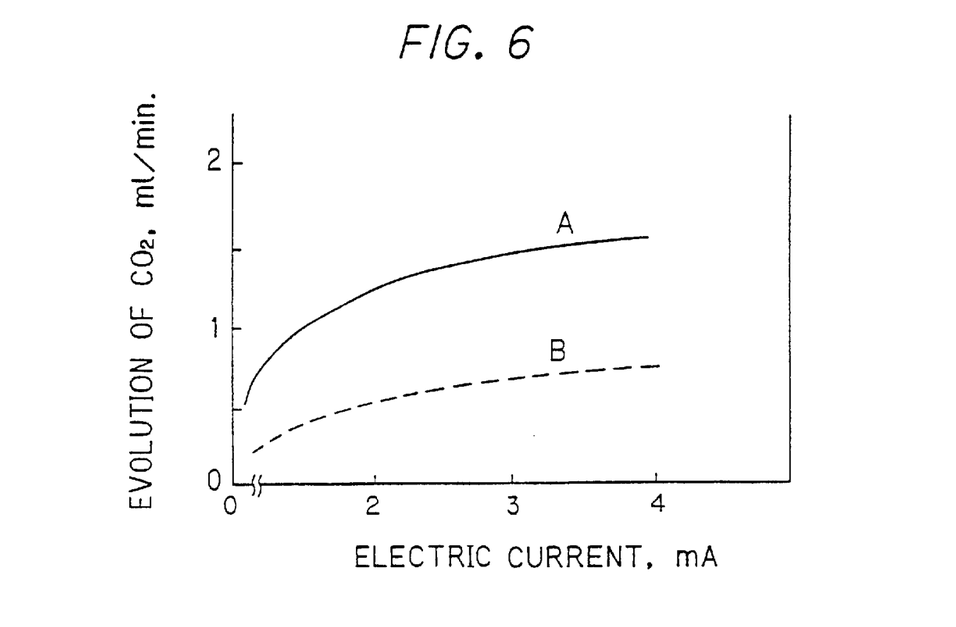
FIG. 6 is a graph showing evolution of carbon dioxide as a function of the electric current through the wastewater with or without application of ultrasonic waves.

Using the same radical generation zone as used in Example 1, a wastewater treatment test was undertaken for a digestion liquid having a COD value of 8000 mg/liter and containing 4000 mg/liter of suspended solid matters to examine evolution of carbon dioxide gas. FIG. 6 graphically shows the rate of carbon dioxide evolution as a function of the electric current with (curve A) or without (curve B) application of the ultrasonic waves in the ultrasonic zone.

It is clear from these results that application of ultrasonic waves is greatly effective in increasing evolution of carbon dioxide.

EXAMPLE 3

Figure 7:
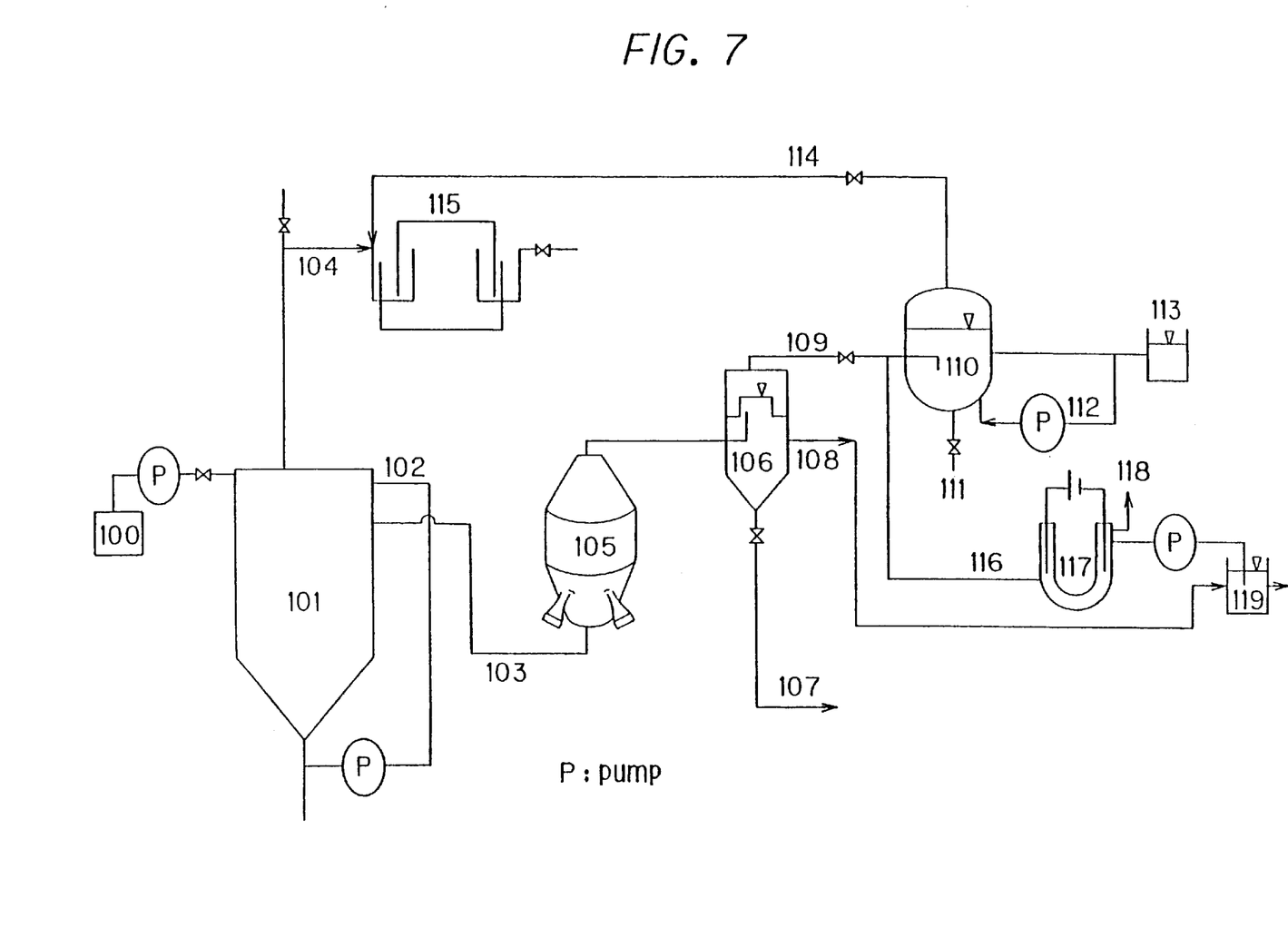
FIG. 7 is a system diagram showing the system involving the inventive wastewater treatment apparatus.

By using the wastewater treatment system according to the inventive method schematically illustrated by the system diagram of FIG. 7, a wastewater treatment test run was undertaken for a wastewater discharge from a swinery which had a COD value of 5000 to 6000 mg/liter and contained 3000 mg/liter of suspended solid matters, 3000 to 4000 mg/liter of total nitrogen and 5000 to 7000 mg/liter of total phosphorus at a pH of 7.0.

Thus, the wastewater from the swinery received in the receiver vessel 100 of 10 liter capacity and continuously introduced at a feed rate of 5 liters/day into a vertical-type fluidized-bed biogas reactor 101 of 23 liter capacity was circulated through the pipeline 102. The effluent liquid discharged out of the biogas reactor 101 was introduced through the pipeline 103 into the wastewater treatment conduit 105 of the invention to be subjected there to an oxidative decomposition treatment and then transferred into the closed-vessel settling tank 106 of 12 liter capacity from which the precipitated sludge was discharged through the outlet pipeline 107 and the effluent liquid was taken through the pipeline 108.

The running conditions of the radical generating part in the wastewater treatment conduit 105 were that a direct-current voltage of 2 kV/cm in a rectangular wave form was applied between the electrodes keeping an average distance of 4 cm to give an electric current density of 6 mÅ/cm$^2$ at a duty ratio of 50%. The positive electrode was coated on the surface with titanium dioxide and had a truncated pyramidal form having side surfaces making an angle of 15 degrees with the 20 cm long negative electrode plated with platinum. The ultrasonic part of the wastewater treatment conduit 105 was equipped with four ultrasonic vibrators of the horn type each driven with supply of 100 watts of oscillating power to emit pulsed ultrasonic waves of 28 kHz frequency at a duty ratio of 50%.

The effluent liquid discharged out of the effluent pipeline 108 was subjected to the water quality test to find a color of zero, $COD_{cr}$ of 50 to 60 mg/liter, total nitrogen of 20 to 30 mg/liter and total phosphorus of 0.1 to 1 mg/liter.

The solid matter precipitated in the closed-vessel settling tank 106 and discharged therefrom at a rate of 14 to 18 g/day on the dry base contained 16% by weight of total phosphorus. This result meant that the phosphorus-containing matters in the raw wastewater feed, which might be either soluble or insoluble in water, could be totally transferred into the solid precipitates recovered from the settling tank 106.

The exhaust gas evolved in the settling tank 106 and discharged through the exhaust pipeline 109 contained 12.0 to 12.5 liters NTP per day of carbon dioxide gas and introduced into the biogas reactor 110 of 5 liter capacity for $CO_2/H_2$ assimilation where the exhaust gas was mixed with 4.28 liters/day of hydrogen gas coming from the electrolyzer 117 and subjected to the methanating fermentation by using methane bacteria. The nutrient salts required for stable running of the biogas reactor 110 in an amount larger than necessary for the multiplication of the methane bacteria could be supplied from the $CO_2/H_2$ assimilation vessel 113. The intermittent circulation pump connected to the biogas reactor 110 and assimilation vessel 113 served to ensure smooth agitation of the liquid in the respective vessels. The water supply to the electrolyzer 117 for hydrogen gas generation could be obtained from the wastewater reservoir 119.

While the transfer rate of methane gas evolved in the fluidized-bed biogas reactor 101 to the gas holder 115 of 10 liter capacity through the first biogas pipeline 104 was 20 to 21 liters/day, the methane gas evolved in the $CO_2/H_2$ assimilation biogas reactor 110 was joined thereto through the second biogas pipeline 114 at a rate of 4.3 liters/day so that the total methane evolution mounted 25 to 26 liters/day.

The running condition of the settling tank 106 could be maintained by discharging the precipitated sludge through the sludge discharge port 107 at a rate of 0.145 to 0.155 liters per every day or 0.29 to 0.32 liter per every 2 days.

INDUSTRIAL APPLICABILITY

As compared with conventional biological wastewater treatment processes, the above described wastewater treatment system according to the present invention can be constructed on only about one tenth area of the installation site and can be operated with only about one twelfth of energy consumption. Nevertheless, the wastewater treatment system is advantageous in respect of the high efficiency for the removal or decrease of carbon source materials, total nitrogen and total phosphorus in wastewater and, in addition, the system is applicable to wastewater containing polyphenol compounds or lignin which can be removed by oxidative decomposition.

What is claimed is:

1. A wastewater treatment conduit through which wastewater containing organic contaminant materials is passed to have the organic contaminant materials oxidatively decomposed therein which comprises:
   (a) a straightly tubular part having a rectangular or circular cross section;
   (b) a radical generating part consisting of
       (b1) a first truncated pyramidal or conical tubular member having a coating layer of a water-insoluble metal oxide coming into contact with the wastewater to serve as a positive electrode and connected at the broader end to the upstream end of the straightly tubular part, the narrower end being open, and
       (b2) a rod member having a surface of a corrosion-resistant metal to serve as a negative electrode and inserted into the truncated pyramidal or conical tubular member along the axial line thereof, and
   (c) an ultrasonic part consisting of
       (c1) a second truncated pyramidal or conical tubular member connected at the broader end to the downstream end of the straightly tubular part, the narrower end being open, and
       (c2) an ultrasonic vibrator mounted on the second truncated pyramidal or conical tubular member (c1).

2. The wastewater treatment conduit according to claim 1 in which the side surface of the first truncated pyramidal tubular member or the generating line of the first truncated conical tubular member makes an angle in the range from 5 to 40 degrees with the axial line.

3. The wastewater treatment conduit according to claim 1 in which the water-insoluble metal oxide on the first truncated pyramidal or conical tubular member is titanium dioxide, iridium dioxide or tin oxide.

4. The wastewater treatment conduit according to claim 1 in which the corrosion-resistant metal forming the surface layer of the negative electrode is platinum.

5. The wastewater treatment conduit according to claim 1 in which the side surface of the second truncated pyramidal tubular member of the generating line of the second truncated conical tubular member makes an angle in the range from 5 to 40 degrees with the axial line.

6. A method for treatment of wastewater containing organic contaminant materials which comprises the steps of:
(A) passing the wastewater through the wastewater treatment conduit which conduit comprises:
  (a) a straightly tubular part having a rectangular or circular cross section and
  (b) a radical generating part consisting of
    (b1) a first truncated pyramidal or conical tubular member having a coating layer of a water-insoluble metal oxide coming into contact with the wastewater to serve as a positive electrode and connected at the broader end to the upstream end of the straightly tubular part, the narrower end being open, and
    (b2) a rod member having a surface of a corrosion-resistant metal to serve as a negative electrode and inserted into the truncated pyramidal or conical tubular member along the axial line thereof from the upstream end toward the downstream end thereof, and
(B) applying a direct current voltage between the positive and negative electrodes to give a voltage gradient in the range from 0.2 to 6 kilovolts/cm producing a pulsed electric current density of 5 $\mu\text{Å/cm}^2$ to 50 $\text{mÅ/cm}^2$ having a rectangular wave form at a frequency in the range from 10 kHz to 150 kHz.

7. A method for treatment of wastewater containing organic contaminant materials which comprises the steps of:
(A) passing the wastewater through the wastewater treatment conduit which conduit comprises:
  (a) a straightly tubular part having a rectangular or circular cross section;
  (b) a radical generating part consisting of
    (b1) a first truncated pyramidal or conical tubular member having a coating layer of a water-insoluble metal oxide coming into contact with the wastewater to serve as a positive electrode and connected at the broader end to the upstream end of the straightly tubular part, the narrower end being open, and
    (b2) a rod member having a surface of a corrosion-resistant metal to serve as a negative electrode and inserted into the truncated pyramidal or conical tubular member along the axial line thereof, and
  (c) an ultrasonic part consisting of
    (c1) a second truncated pyramidal or conical tubular member connected at the broader end to the downstream end of straightly tubular part, the narrower end being open, and
    (c2) an ultrasonic vibrator mounted on the second truncated pyramidal or conical tubular member (c1), from the upstream end toward the downstream end thereof;
(B) applying a direct current voltage between the positive and negative electrodes to give a voltage gradient in the range from 0.2 to 6 kilovolts/cm producing a pulsed electric current density of 5 $\mu\text{Å/cm}^2$ to 50 $\text{mÅ/cm}^2$ having a rectangular wave form at a frequency in the range from 10 kHz to 150 kHz; and
(C) driving the ultrasonic vibrator to emit pulsed ultrasonic waves, the emission periods of the ultrasonic waves being limited to coincide with the intermission periods of the pulsed electric current.

8. The method for treatment of wastewater containing organic contaminant materials according to claim 7 in which the frequency of the ultrasonic waves is in the range from 20 to 100 kHz.

* * * * *

UNITED STATES PATENT AND TRADEMARK OFFICE
CERTIFICATE OF CORRECTION

PATENT NO. : 6,547,951 B1  
DATED : April 15, 2003  
INVENTOR(S) : Takaaki Maekawa et al.

It is certified that error appears in the above-identified patent and that said Letters Patent is hereby corrected as shown below:

<u>Title page,</u>
Item [87], please change the PCT filiing date from "Mar. 3, 2001" to -- Mar. 3, 2000 --.

<u>Column 9,</u>
Line 29, please change "$\mu\text{Å/cm}^2$" to -- $\text{uA/cm}^2$ --.

<u>Column 10,</u>
Line 25, please change "$\text{mÅ/cm}^2$" to -- $\text{mA/cm}^2$ --.

Signed and Sealed this

Fourteenth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,547,951 B1
DATED : April 15, 2003
INVENTOR(S) : Takaaki Maekawa et al.

It is certified that error appears in the above-identified patent and that said Letters Patent is hereby corrected as shown below:

<u>Column 9,</u>
Line 29, please change "uA/cm$^2$" to -- $\mu$A/cm$^2$ --.
Line 29, please change "mÅ/cm$^2$" to -- mA/cm$^2$ --.

<u>Column 10,</u>
Line 25, please change "$\mu$Å/cm$^2$" to-- $\mu$A/cm$^2$ --

Signed and Sealed this

Fourth Day of May, 2004

JON W. DUDAS
*Acting Director of the United States Patent and Trademark Office*